(12) United States Patent
Prats Mustarós et al.

(10) Patent No.: US 9,719,494 B2
(45) Date of Patent: Aug. 1, 2017

(54) METHODS OF OPERATING A WIND TURBINE, WIND TURBINES AND WIND PARKS

(71) Applicant: ALSTOM RENEWABLE TECHNOLOGIES, Grenoble (FR)

(72) Inventors: Josep Prats Mustarós, Barcelona (ES); Marc Guadayol Roig, Terrassa (ES)

(73) Assignee: ALSTOM Renewable Technologies, Grenoble (FR)

( * ) Notice: Subject to any disclaimer, the term of this patent is extended or adjusted under 35 U.S.C. 154(b) by 26 days.

(21) Appl. No.: 14/553,931

(22) Filed: Nov. 25, 2014

(65) Prior Publication Data
US 2015/0152846 A1 Jun. 4, 2015

(30) Foreign Application Priority Data

Nov. 29, 2013 (EP) .................................... 13382484

(51) Int. Cl.
*F03D 7/04* (2006.01)
*F03D 7/02* (2006.01)

(52) U.S. Cl.
CPC ............ *F03D 7/048* (2013.01); *F03D 7/028* (2013.01); *F03D 7/0276* (2013.01); *F05B 2270/1012* (2013.01); *F05B 2270/1075* (2013.01); *F05B 2270/32* (2013.01); *F05B 2270/404* (2013.01); *Y02E 10/723* (2013.01)

(58) Field of Classification Search
CPC ........ Y02E 10/725; Y02E 10/72; Y02E 10/74
USPC ................................... 290/44, 55
See application file for complete search history.

(56) References Cited

U.S. PATENT DOCUMENTS 4,339,666 A * 7/1982 Patrick .................. F03D 7/0224
290/44
4,700,081 A * 10/1987 Kos ....................... F03D 7/0272
290/44

(Continued)

FOREIGN PATENT DOCUMENTS

DE 3150824 A1 * 8/1982 ........... F03D 7/0224
GB 2206930 A * 1/1989 ........... F03D 7/0248

(Continued)

OTHER PUBLICATIONS

European Search Report for EP 13382484.7, mailed Apr. 30, 2014, 6 pgs.

*Primary Examiner* — Tulsidas C Patel
*Assistant Examiner* — Charles Reid, Jr.
(74) *Attorney, Agent, or Firm* — Dority & Manning, P.A.

(57) ABSTRACT

Methods of operating a variable speed wind turbine as a function of a wind speed, the wind turbine having a rotor with a plurality of blades, a generator having a rated output power, and one or more pitch mechanisms for rotating the blades around their longitudinal axis, and a system for varying a torque of the generator. The methods comprise a sub-nominal zone of operation for wind speeds below a nominal wind speed and a supra-nominal zone of operation for wind speeds at or above the nominal wind speed, wherein at wind speeds at or near the nominal wind speed, the generator is allowed to generate more than its rated output power for a limited period of time. Also disclosed are wind turbines and wind farms adapted to perform these methods.

14 Claims, 4 Drawing Sheets

(56) References Cited

U.S. PATENT DOCUMENTS

| | | | | |
|---|---|---|---|---|
| 4,703,189 | A | * | 10/1987 | DiValentin ............ F03D 7/0224 290/44 |
| 6,320,272 | B1 | * | 11/2001 | Lading ................. F03D 7/0224 290/44 |
| 6,850,821 | B2 | * | 2/2005 | Weitkamp ............ F03D 7/0276 114/39.3 |
| 2003/0185665 | A1 | * | 10/2003 | Hansen ................ F03D 7/0224 415/1 |
| 2006/0273595 | A1 | * | 12/2006 | Avagliano ............. F03D 7/028 290/44 |
| 2010/0187820 | A1 | * | 7/2010 | Wakasa ................ F03D 7/0224 290/44 |
| 2010/0270798 | A1 | | 10/2010 | Poulsen et al. |
| 2012/0292903 | A1 | * | 11/2012 | Merkel ................ F03D 7/0272 290/44 |
| 2013/0026759 | A1 | * | 1/2013 | Krueger ............... F03D 7/0272 290/44 |
| 2013/0140818 | A1 | * | 6/2013 | Matesanz Gil ......... F03D 7/048 290/44 |
| 2013/0270827 | A1 | | 10/2013 | Couchman et al. |
| 2015/0054280 | A1 | * | 2/2015 | De Boer .............. F03D 7/0224 290/44 |
| 2015/0137519 | A1 | * | 5/2015 | Tarnowski ............ F03D 7/0284 290/44 |

FOREIGN PATENT DOCUMENTS

| | | | |
|---|---|---|---|
| WO | WO 2011160634 A1 * | 12/2011 | .......... F03D 7/0292 |
| WO | WO 2013/000468 | 1/2013 | |

* cited by examiner

METHODS OF OPERATING A WIND TURBINE, WIND TURBINES AND WIND PARKS

This application claims the benefit of European Patent Application EP13382484.7 filed on 29 Nov. 2013, which is hereby incorporated by reference in its entirety.

The present disclosure relates to methods of operating a wind turbine, wind turbines and wind parks suitable for such methods.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

A variable speed wind turbine may typically be controlled by varying the generator torque and the pitch angle of the blades. As a result, aerodynamic torque, rotor speed and electrical power generated will vary.

Figure 1:
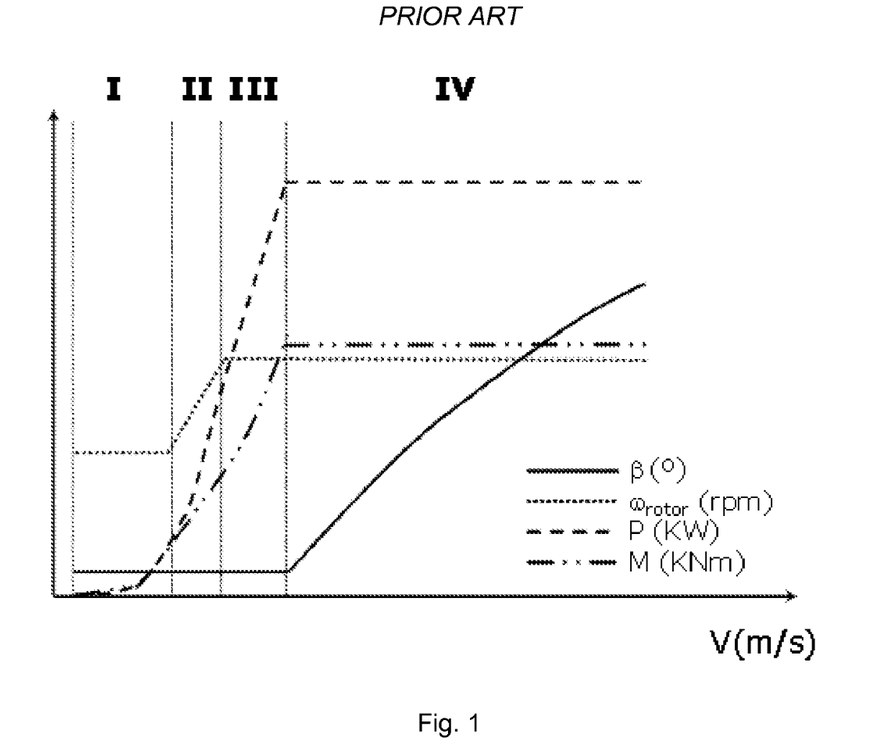
FIG. 1 illustrates a typical power curve of a wind turbine.

A common prior art control strategy of a variable speed wind turbine is described with reference to FIG. 1. In FIG. 1, the operation of a typical variable speed wind turbine is illustrated in terms of the pitch angle (β), the electrical power generated (P), the generator torque (M) and the rotational velocity of the rotor (ω), as a function of the wind speed.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades so as to capture maximum energy. In general, in the second operational range, the pitch angle of the blades may be substantially constant, although the optimal blade setting may theoretically depend on the instantaneous wind speed. In order to achieve this objective, the generator torque and rotor speed may be varied so as to keep the tip speed ratio λ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$T=k \cdot \omega^2$, wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1. Such a power curve may reflect the optimum operation of the wind turbine under steady-state conditions.

In the supra-nominal zone of operation (wind speeds at or above the nominal wind speed), the maximum available energy in the wind stream is very consciously not captured. That is, the blades are actively pitched to a position in which they "catch" less wind, and generate less torque than possible. This is mainly done to limit the loads on the wind turbine.

The point on the power curve representing the electrical power generated at nominal wind speed is generally referred to as the "power curve knee".

The power curve may be regarded as the key performance characteristic establishing the power output that may be expected from a wind turbine. The power curve is thus also often used to predict a wind turbine's profitability. Based on the wind data available for a specific site, and on the power curve, an expected energy output over e.g. a month, a year or a number of years may be predicted.

The wind data that may be available for a specific site is gathered over a period of time and is generally determined based on 10 minute averages. That is, average wind speed(s) and direction(s) as calculated over 10 minutes of time are the outcome of this process and form the input for a possible calculation of expected energy output of wind turbine. Also, in the evaluation of the performance of a wind turbine or a wind park such 10 minute averages may be used. Obviously other time intervals could also be used.

It has been found that wind turbines and wind parks regularly underperform with respect to the given power curve. Especially, in and around the "power curve knee", the generated power at average wind speeds equal to or slightly different than the nominal wind speed, the electrical output of a wind turbine is generally less than expected. This is mainly because if an average wind speed over 10 minutes is determined to correspond to the nominal wind speed, this inevitably means that for some time the instantaneous wind speed was below the nominal wind speed, and for some time the instantaneous wind speed was actually above the nominal wind speed. Because of the operation strategy implemented in wind turbines, the output power at instantaneous wind speeds above the nominal wind speed is "capped" at the nominal power (the generated electrical power does not increase at higher wind speeds), whereas at instantaneous wind speeds below the nominal wind speed, the generated electrical power does decrease.

The power curve is thus rounded or flattened around the "power curve knee". The extent to which the electrical power output is reduced compared to the expected value is dependent mainly on wind variability, i.e. turbulence. Over the life time of a wind turbine, the wind speed may relatively often be close to the nominal wind speed. The problem of rounding of the power curve knee thus should not be underestimated.

The present disclosure relates to various methods and systems for avoiding or at least partly reducing this problem.

SUMMARY

In a first aspect, a method of operating a variable speed wind turbine as a function of a wind speed is disclosed. The wind turbine has a rotor with a plurality of blades, a generator having a rated output power, one or more pitch mechanisms for rotating the blades around their longitudinal axis, and a system for varying a torque of the generator. The method comprises a sub-nominal zone of operation for wind speeds below a nominal wind speed and a supra-nominal zone of operation for wind speeds at or above the nominal wind speed, wherein at wind speeds at or near the nominal wind speed, the generator is allowed to generate more than its rated output power for a limited period of time.

In accordance with this first aspect, at wind speeds at or near the nominal wind speed (e.g. just above the wind speeds), the generator is allowed to produce more than its rated (=theoretical maximum) output power. By doing so, the 10 minute averages of power output will correspond better to the expected power output according to the power curve. By only allowing the generated power to be above the maximum rated power for only a limited period of time, damage to the generator may effectively be avoided. Additionally, the accumulation of loads on the wind turbine may also be kept within acceptable boundaries.

An implementation may comprise determining that the wind speed approaches the nominal wind speed, e.g. reaches a predefined limit wind speed close to the nominal wind speed. A first predefined limit wind speed could be defined below the nominal wind speed and a second predefined limit wind speed could be defined above the nominal wind sped. When the determination is made that the wind speed reaches one of these limits, temporarily the limit of power curve may be removed or substituted by another limit, e.g. an adapted output power limit. The determination of the wind speed reaching one of these limits could be based e.g. on one or more of the following: nacelle anemometry, LIDAR, measuring electrical power output, measuring pitch angles, measuring loads in one or more wind turbine components.

In some embodiments, the generator may be allowed to generate more than its rated maximum output power only in a predetermined range of wind speeds above the nominal wind speed, for example the predetermined range may be from the nominal wind speed to 2 m/s above nominal wind speed. By defining such a predetermined wind range, it may be ensured that only in the relevant part of the power curve a deviation from the normal operational strategy takes place.

In some embodiments, at wind speeds at or near the nominal wind speed, the generator is allowed to generate electrical power up to an adapted output power limit. Optionally, the adapted output power limit may be a predefined constant. The adapted output power limit may be a predefined amount or a predefined percentage above the maximum rated power. Alternatively, the adapted output power limit may be variable. In order to avoid too high loads (on the generator and other components), a new adapted output power limit may be defined if e.g. a wind gust were to occur at a prevailing wind speed close to the nominal wind speed. Such an adapted output power limit can ensure that loads on the wind turbine may still be kept under control.

In some embodiments, the adapted output power limit is a function of the time that the generator has generated more than its rated maximum output power. Optionally, the adapted output power limit reduces exponentially as a function of the time that the generator has generated more than its rated maximum output power, so that it eventually reaches its steady-state value. This situation arises when a wind speed increases not as a consequence of fluctuations around its nominal value but as a result of an actual increase on the average wind speed. In such a case, the state-state conditions for said increased averaged wind speed (above the wind speed at the power knee) are recovered, by limiting power output to the nominal power of the wind turbine. As such, fatigue of wind turbine components can stay under control as the steady state power curve is followed under most conditions, and only occasionally an adapted power output limit is used. In other embodiments, the adapted output power limit may be a function of a temperature of a generator component or of the current of a generator component.

In some embodiments, in the sub-nominal zone of operation, the blades are not pitched, and the sub-nominal zone of operation may comprise a first operational range, a second operational range and a third operational range. The first operational range extends from a cut-in wind speed to a first wind speed, wherein the rotor speed is kept substantially constant at a first value. The second operational range extends from the first wind speed to a second wind speed, wherein both the rotor speed and generator torque are varied as a function of wind speed. And the third operational range extends from the second wind speed to the nominal wind speed, wherein the rotor speed is normally kept substantially constant at a second value. In these embodiments, in the sub-nominal zone of operation, a "classic" control for variable speed wind turbines may generally be implemented for most conditions.

In some embodiments, in the supra-nominal zone of operation, the blades are normally pitched to maintain an aerodynamic torque at a substantially constant level. Again, classic control strategy for variable speed wind turbines may be implemented in steady state conditions, and in most conditions in general. However, for variations around the nominal wind speed, temporarily the aerodynamic torque is allowed to increase above a standard maximum, i.e. the blades are not pitched or not pitched to the same extent. Or the blades may be pitched with a certain "delay".

The classic control strategy for steady state conditions for the sub-nominal zone of operation and/or for the supra-nominal zone of operation may be combined with any of the examples of temporary overload of the generator herein described.

In some embodiments, the method of control is based on a (non-linear) model predictive control based on instantaneous wind speeds and predicted wind speeds. If wind flows can be predicted with sufficient accuracy using e.g. a LIDAR, this data may be used to optimize control of a wind turbine.

Model predictive control (MPC) aims at effectively solving problems of control and automation of processes that are characterized by having a complicated, multivariate and/or unstable dynamic behaviour. The control strategy underlying this type of control uses a mathematical model of the process to be controlled to predict the future behaviour of that system and, based on this future behaviour, it can predict future control signals.

MPC is part of the so-called optimal controllers, i.e. those in which actuations correspond to an optimization of a criterion. The criterion to be optimized, or the "cost function", is related to the future behaviour of the system, which is predicted by considering a dynamic model thereof, which is called the prediction model.

MPC is a flexible, open and intuitive technique, which permits dealing with linear and nonlinear, multi-variable and mono-variable systems by using the same formulation for the algorithms of the controller. Moreover, the MPC control laws respond to optimization criteria, and allow incorporating constraints in the synthesis or implementation of the controller. MPC also provides the ability of incorporating constrains in the calculations of the actuations. These constrains may be in terms of e.g. maximum rated output power of the generator and/or maximum allowable loads and/or maximum rotor speed etc.

In some examples, the cost function to be optimized may be the electrical power generated over a life time of the wind turbine. In other embodiments, the cost function to be optimized may be the financial compensation for the electrical power generated over the life time of the wind turbine. In yet further embodiments, the cost function to be optimized may be to match as closely as possible the electrical power generated to the electrical power demanded (by e.g. a grid operator).

In any of these embodiments of this aspect, the boundary conditions may be "soft" boundary conditions or "hard" boundary conditions. Hard boundary conditions are those conditions that may never be violated and soft boundary conditions are those boundary conditions that are preferably not violated, but may occasionally be violated to a limited extent. (in this case, maximum rated output power). Violation of such a soft constraint may be suitable when the expected gain in the cost function to be optimized is relatively or disproportionally high. In an MPC strategy a constraint regarding average output power could be incorporated.

Applying the MPC strategy in accordance with any of the embodiments of this aspect could lead e.g. to a variation in pitch angle in the sub-nominal zone of operation. Also, the MPC strategy could lead to a variation in rotor speed in the supra-nominal zone of operation.

In another aspect, a wind turbine is provided. The wind turbine has a rotor with a plurality of blades, a generator having a rated maximum output power, and one or more pitch mechanisms for rotating the blades around their longitudinal axis, a system for varying a torque of the generator, and a wind turbine controller adapted to carry out any of the methods substantially as hereinbefore described.

Optionally, these wind turbines may be direct drive wind turbines. Optionally, the generators of these wind turbines may be permanent magnet generators. Relatively strict load control is generally required for gearboxes. In direct drive wind turbines which do not have a gearbox, the above described methods may thus be more easily implemented.

In yet a further aspect, a wind farm (or "wind park") comprising a plurality of such wind turbines is provided. In some embodiments, a central control system adapted to command or influence the wind turbine controllers of the plurality of wind turbines is provided to control the electrical output power of the wind farm. A central control system may be used to ensure that nominal output power for the wind farm is not exceeded at any given time. Another possible application of a central control system may be that the extent to which the turbines are overloaded may be divided between the different wind turbines in a wind farm. The corresponding (thermal and other) loads may be more equally divided between turbines in the wind farm. The central control system may optionally be adapted to command or influence the wind turbine controllers of the plurality of wind turbines based at least partially on a temperature of a generator component of each of the wind turbines. Additionally, or alternatively, the central control system may be adapted to command or influence the wind turbine controllers of the plurality of wind turbines based at least partially on an amount of time that each of the wind turbines has generated more than its rated output power.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 2A:
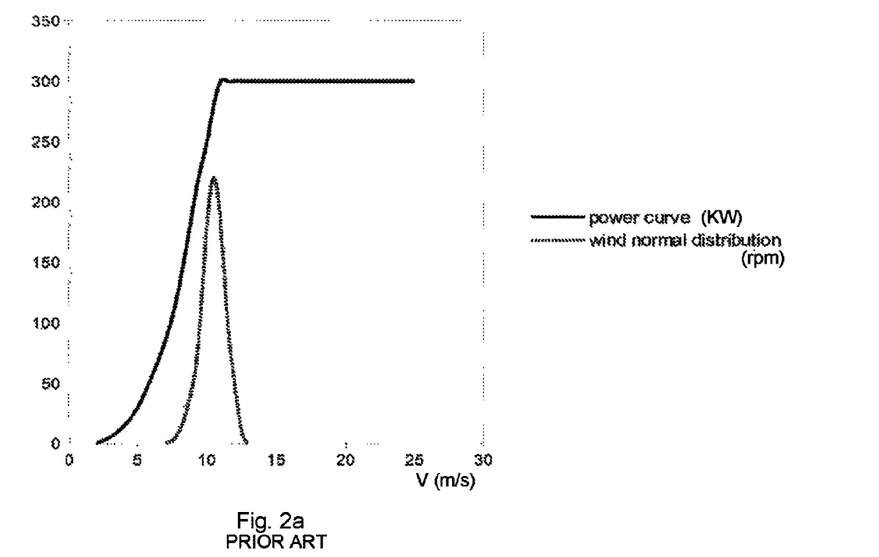
FIGS. 2a-2b illustrate respectively a prior art power curve and the phenomenon of wind variability, and an example of an adapted power curve.

The power curve of FIG. 1 has been discussed before. A very similar power curve is shown in FIG. 2a. In this example, the nominal wind speed (typically defined as the free stream wind speed at the height of the hub) is assumed to be approximately 11 m/s.

In FIG. 2a, a second curve shows a typical Gaussian curve of the probability distribution of wind speeds around the nominal wind speed of 11 m/s that may be measured during any given time interval, e.g. 10 minutes. That is, within a 10 minute interval, with an average wind speed of 11 m/s, the measured wind speed will vary.

As explained before, at lower than nominal wind speeds, the power output varies in accordance with the variation of the wind speed. But at higher than nominal wind speeds, the power output does not vary and is capped at the rated output power of the generator.

Figure 2B:
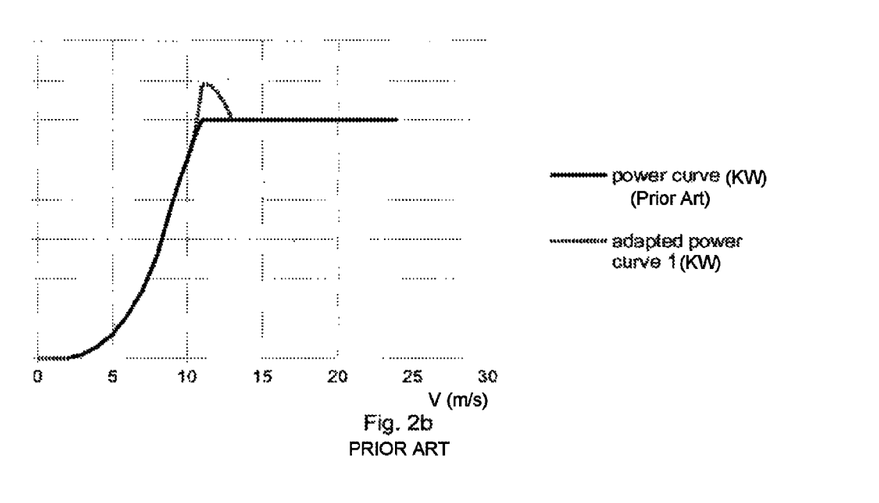

In FIG. 2b, a typical prior art power curve, and an adapted power curve according to an embodiment are shown. As may be seen, the adapted power curve allows a generator to generate more than rated output power in a range of wind speeds at and above the nominal wind speed.

An adapted power curve may be characterized by the definition of an adapted output power limit which may be a function of the wind speed as illustrated in FIG. 2b. The adapted output power limit may be above the maximum rated output power only in a range of wind speeds that is relatively close to the nominal wind speed, e.g. from the nominal wind speed to e.g. 2 or 3 m/s above the nominal wind speed. The range may be established as a function of local turbulence conditions.

The adapted power output limit may further be a function of the time that the generator has been working above its rated power. The adapted output power limit may be reduced as the situation of "above rated power" prolongs, this being an indication of an actual change of wind speed regime resulting in an increase on the average wind speed instead of a mere fluctuation around the initial average wind speed. This reduction may be linear but may also be exponential. A maximum period of time that the generator may be allowed to work above its rated power may be limited to e.g. 20 seconds or 10 seconds.

Alternatively, an instantaneous adapted power output limit may be based on a measured temperature of a suitable generator component. As currents in the generator increase above their nominal values, the temperature in the generator may rise. In order not to damage the generator, the adapted power output limit may be adapted as a function of the measured temperature.

For a limited period of time, the wind turbine may be overloaded. If the wind speed stays above the nominal wind speed for a longer period of time, the "normal" control strategy will automatically be implemented. The switch over to normal control may be implemented in a variety of ways. In a first example, a simple maximum time limit may be used. Once the wind turbine has been overloaded for a specified maximum time period, the original "steady state" power curve is followed. The maximum time limit may be eg. 10 seconds or 20 seconds.

The switch over may be gradual in that the adapted power limit may be reduced as a function of time and in an exponential manner approach the original power curve.

Figure 3:
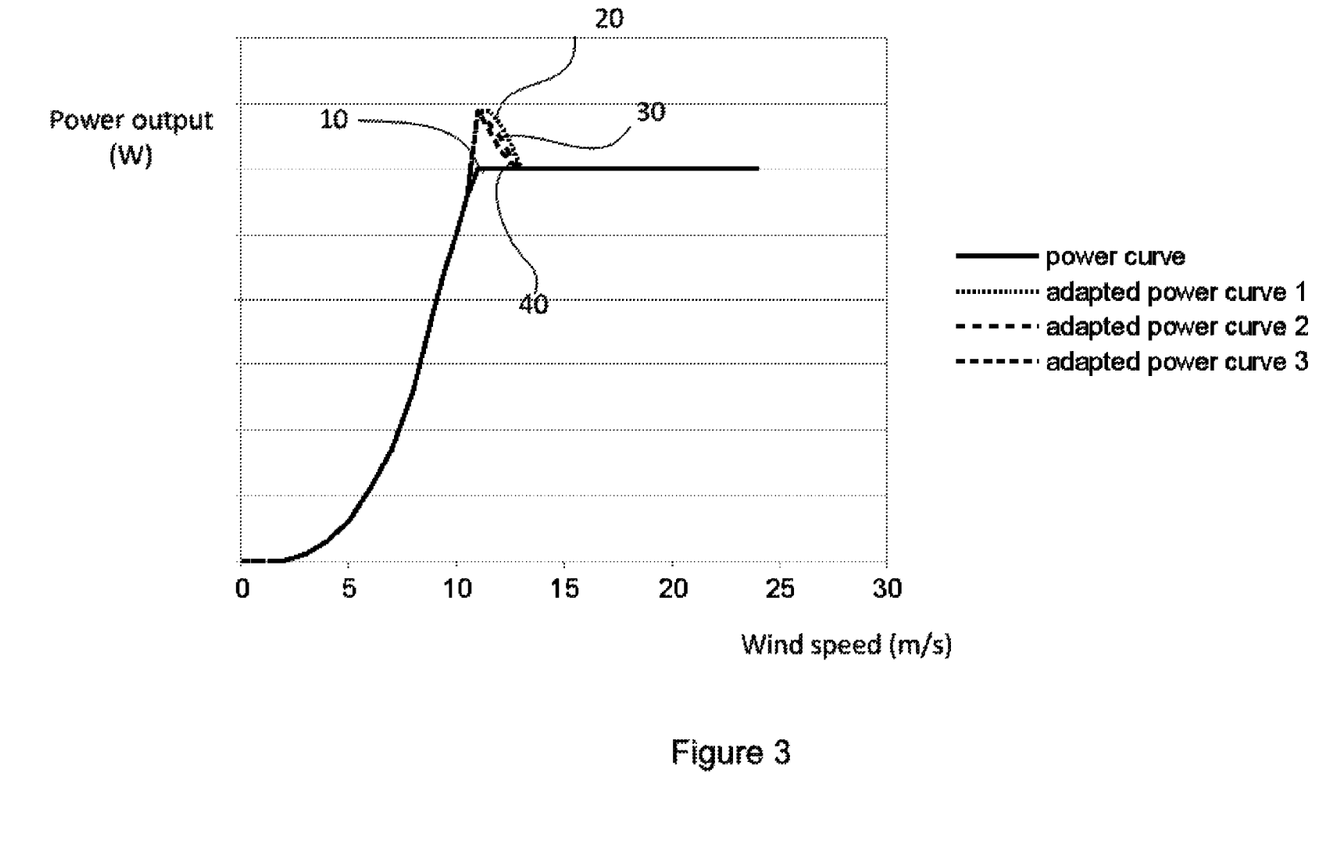
FIG. 3 illustrates a further example of a method of operating a wind turbine.

FIG. 3 illustrates another example of a method of operating a wind turbine. FIG. 3 shown four different curves. The curve 10 is the steady state power curve. The curves 20, 30 and 40 show a plurality of adapted power curves. Curve 20 represents a power curve with an adapted power output limit that is a function of a wind speed. Curves 30 and 40 show additional adapted power curves which show adapted power output limits as a function of the wind speed. Curves 10, 20, 30 and 40 may coincide substantially completely for wind speeds below the nominal wind speed. In a region of wind speeds just above the nominal wind speed, the curves differ.

In order to illustrate an example of operating a wind turbine, let's consider a situation in which the wind speed oscillates around the nominal wind speed. In a first instance, when the wind speed temporarily surpasses the nominal wind speed, the generator is allowed to generate more than its rated power as indicated by curve 20.

As time progresses however, in order to limit loads (e.g. thermal, mechanical, aerodynamic, and other) the adapted power curve may get closer to the normal steady state power curve. One way of implementing this is by determining a temperature of a relevant component of a generator. As the temperature in the generator rises, the adapted output power limit decreases. In this example, as the temperature of the generator rises, the control of the wind turbine passes onto curve 30. The adapted power curve 30 has generally lower values of power than curve 20. Therefore, as the temperature rises, the extent to which the generator may be overloaded is limited.

As the temperature rises further, the control of the wind turbine may pass onto curve 40, which has lower values than curve 30 (but still has power output levels above the steady state curve for wind speeds just above the nominal wind speed). The extent to which the generator may be overloaded is thus further reduced. This process may continue until eventually, the power curve applied is the original steady state curve. An infinity or a relatively large number of adapted power curves could thus be defined, wherein as a function of a relevant temperature in a generator, the control of the wind turbine follows one or another power curve.

Although in this example, the switches from one power curve to another may be based on a temperature in the generator, in another example these switches may be based on e.g. the amount of time that the wind turbine has "recently" been producing more than its rated power. In this sense, a register may be kept that counts the periods of time a wind turbine has been overloaded in the last minute, or last 2 minutes, or e.g. last 3-5 minutes. As an example, if the number of seconds that the turbine has "recently" been overloaded is 5 seconds, then the curve 20 may be followed. If the number of seconds of overloading reaches 10 seconds, then curve 30 may be followed, and so on.

Figure 4:
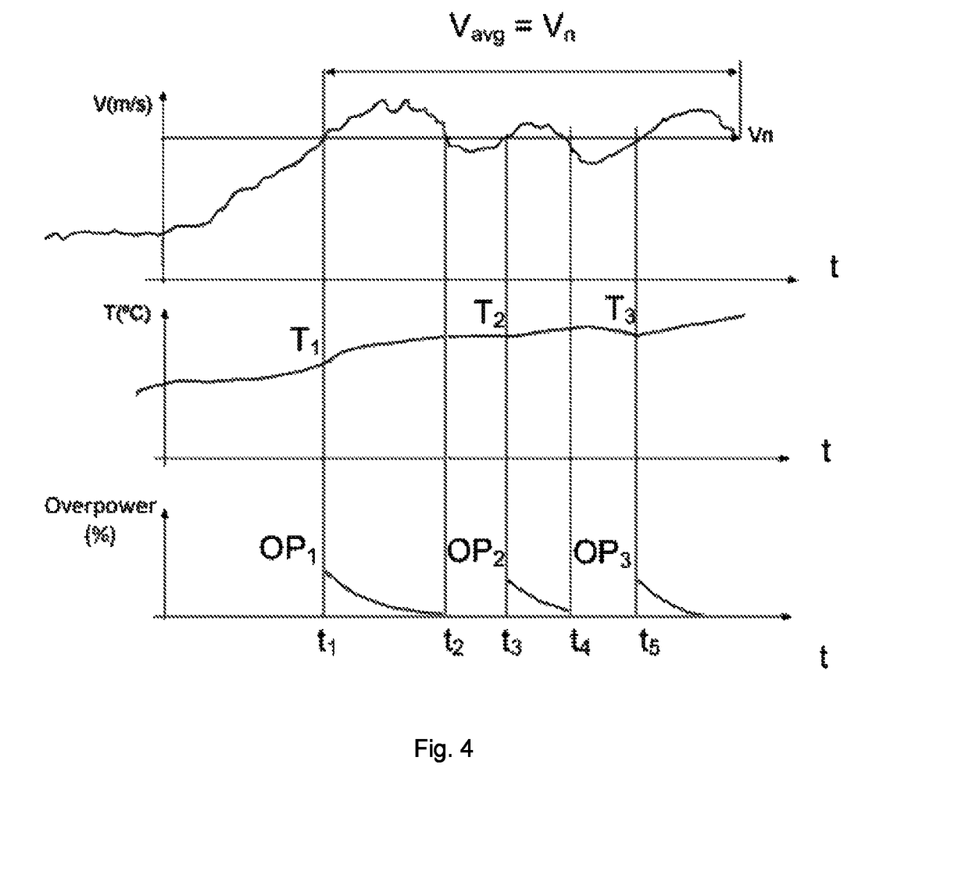
FIG. 4 illustrates yet another example of a method of operating a wind turbine.

FIG. 4 illustrates yet another example of a method of operating a wind turbine. In the top part of FIG. 4 the development of the wind speed over time is schematically illustrated. In the middle part of FIG. 4, the development of a temperature of (a component of) the generator over time is schematically illustrated. In the bottom part of FIG. 4, an overpower (or "overload") in the generator over time is illustrated.

In this example, the instantaneous wind speed surpasses the nominal wind speed at $t_1$. In this instance, since in this example this is the first time that the wind speed surpasses the nominal wind speed, the wind turbine is allowed to generate more than its rated power. The allowed overpower may be a function of time, e.g.:

$$OP_{max}(t) = OP_1 \cdot e^{\left(\frac{-t}{\tau}\right)},$$

wherein $OP_{max}$ is the maximum allowed overpower, which is allowed at any given moment as a function of time, t. The allowed overpower may be expressed in absolute terms, but in this example the allowed overpower is a percentage of the rated voltage. Herein, $\tau$ is the "mean life time" (or the "time constant") in the exponential decay. And $OP_1$ corresponds to the maximum overpower allowed. In this example the maximum allowable overpower $OP_1$ may be a function of a generator temperature.

During the period from $t_1$ to $t_2$, the allowed overpower exponentially decays from $OP_1$ to zero. In this example, $OP_1$ may for example be 10%. The point in time $t_2$ corresponds to the moment in time at which the instantaneous wind speed decreases below the value of the nominal wind speed. During this time of overpower, the temperature of the generator may rise as indicated in the middle part of the figure from $t_1$ to $t_2$.

In an example, the time constant may be chosen such that after approximately 10 or 15 or 20 seconds, the overpower has decreased to 0%.

From $t_2$ to $t_3$, the instantaneous wind speed is below the nominal wind speed. At $t_3$, the wind speed increases above the nominal wind speed and an overloading of the generator is temporarily allowed. From $t_3$, the maximum allowed overpower decreases in accordance with:

$$OP_{max}(t) = OP_2 \cdot e^{\left(\frac{-t}{\tau}\right)}.$$

Herein $OP_2$ is the maximum allowed overpower at $t_3$. $OP_2$ may be lower than $OP_1$ because the temperature $T_2$ at the moment of beginning the overloading may be higher than $T_1$. $OP_2$ may be equal to e.g. 5% and decrease exponentially to almost 0% until $t_4$. At $t_4$ the wind speed is below the nominal wind speed again.

When the wind speed increases above the nominal wind speed again, at $t_5$, depending on the temperature $T_3$ of the generator, the maximum allowable overpower at this moment $OP_3$ may be determined. In this example, if $T_2$ is equal to $T_3$, then $OP_2$ may be equal to $OP_3$.

As illustrated, the 10 minute average wind speed $V_{avg}$ may be equal to the nominal wind speed $V_n$ (e.g. 10.5 m/s or 11 m/s), but will oscillate around this average. By temporarily allowing overloading, the energy output over these 10 minutes may be equal to or at least closer to the theoretically expected energy output based on the steady state power curve.

Any of the mentioned or illustrated examples of operating wind turbines may be implemented in a wind farm comprising a plurality of wind turbines. A central control system (e.g. SCADA) may then directly or indirectly control one or more of the wind turbines with respect to overloading. E.g. a central control system may send direct commands to the individual wind turbines or may send e.g. boundary conditions to the individual wind turbines within which the individual wind turbines have to perform.

These commands and/or boundary conditions may be coordinated in such a manner that not always the same wind turbine is overloaded, but instead that the overloading is more equally distributed between different wind turbines. The distribution from the central control system may be based e.g. on a temperature of a generator or generator component of the wind turbines. The distribution could also be based on an instantaneous current in the generators of the wind turbines. Yet a further option is to base this distribution at least partially on accumulated loads (e.g. over the life time) of the wind turbines.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a variable speed wind turbine as a function of a wind speed, the wind turbine having a rotor with a plurality of blades, a generator having a rated output power, and one or more pitch mechanisms for rotating the blades around their longitudinal axis, and a system for varying a torque of the generator, a sub-nominal zone of operation for wind speeds below a nominal wind speed and a supra-nominal zone of operation for wind speeds at or above the nominal wind speed, the method comprising:

at wind speeds at or near the nominal wind speed, allowing the generator to generate an adapted output power that is more than the rated output power for a pre-defined period of time, the adapted output power having a maximum limit; and wherein the adapted output power limit is variable and determined as a function of temperature of a component of the wind turbine and the pre-defined period of time is set by a time constant before generation of the adapted output power such that the adapted output power decays exponentially substantially zero over an entirety of the pre-defined period of time regardless of temperature change of the component of the wind turbine during the pre-defined period of time.

2. The method according to claim 1, wherein the generator is allowed to generate more than its rated output power only in a predetermined range of wind speeds at or around the nominal wind speed.

3. The method according to claim 2, wherein the predetermined range is approximately from nominal wind speed to 2 m/s above nominal wind speed.

4. The method according to claim 1, wherein the adapted output power limit is a function of the time that the generator has generated more than the rated maximum output power.

5. The method according to claim 4, wherein the adapted output power limit reduces exponentially as a function of the time that the generator has generated more than its rated maximum output power.

6. The method according to claim 4, wherein the adapted power output limit is a function of the time that the generator has generated more than the rated maximum output power in a recent period of time, wherein the recent period of time is between 30 seconds and five minutes, or between 1 minute and 3 minutes.

7. The method according to claim 1, wherein the adapted power output limit is a function of the wind speed.

8. The method according to claim 7, wherein the adapted power output limit is a function of the time that the generator has generated more than the rated maximum output power.

9. The method according to claim 1, further comprising using model predictive control based on instantaneous wind speeds and/or predicted wind speeds.

10. A wind turbine having a rotor with a plurality of blades, a generator having a rated output power, one or more pitch mechanisms for rotating the blades around their longitudinal axis, a system for varying a torque of the generator, and a wind turbine controller adapted to carry out the method according to claim 1.

11. The wind turbine according to claim 10, wherein the wind turbine is a direct drive wind turbine.

12. A wind farm comprising a plurality of wind turbines according to claim 10.

13. A central control system and the wind farm according to claim 12, wherein the central control system is adapted to command or influence the wind turbine controllers of the plurality of wind turbines to control the electrical output power of the wind farm.

14. The central control system and wind farm according to claim 13, wherein the central control system is adapted to command or influence the wind turbine controllers of the plurality of wind turbines based at least partially on an amount of time that each of the wind turbines has generated more than its rated output power.

* * * * *